United States Patent
Lin et al.

(10) Patent No.: US 10,045,351 B2
(45) Date of Patent: *Aug. 7, 2018

(54) SYSTEMS AND METHODS FOR DIFFERENT TDD CONFIGURATIONS IN CARRIER AGGREGATION

(71) Applicant: MEDIATEK INC., Hsinchu (TW)

(72) Inventors: Shiang-Jiun Lin, Hsinchu (TW);
Pei-Kai Liao, Nantou County (TW);
Meng-Ying Tsai, Taichung (TW);
Yih-Shen Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,419

(22) Filed: Aug. 17, 2015

(65) Prior Publication Data
US 2015/0358978 A1     Dec. 10, 2015

Related U.S. Application Data

(63) Continuation of application No. 13/527,286, filed on Jun. 19, 2012, now Pat. No. 9,137,804.
(Continued)

(51) Int. Cl.
*H04W 72/04*    (2009.01)
*H04L 5/14*    (2006.01)
(Continued)

(52) U.S. Cl.
CPC ......... *H04W 72/048* (2013.01); *H04L 5/0053* (2013.01); *H04L 5/0094* (2013.01);
(Continued)

(58) Field of Classification Search
CPC ......... H04L 5/001; H04L 5/14; H04L 5/0053; H04L 5/0023; H04W 72/0453; H04W 72/04
(Continued)

(56) References Cited

U.S. PATENT DOCUMENTS

| 8,374,212 B2 * | 2/2013 | Charbit .................. H04B 1/715 375/132 |
| 2007/0160074 A1 | 7/2007 | Yamaguchi et al. .......... 370/442 |

(Continued)

FOREIGN PATENT DOCUMENTS

| CN | 101345608 A | 7/2007 |
| CN | 101557612 B | 4/2008 |

(Continued)

OTHER PUBLICATIONS

International Search Report and Written Opinion of International Search Authority for PCT/CN2012/077316 dated Oct. 4, 2012 (13 pages).
(Continued)

*Primary Examiner* — Charles C Jiang
*Assistant Examiner* — Will Lin
(74) *Attorney, Agent, or Firm* — Imperium Patent Works; Helen Mao; Zheng Jin

(57) ABSTRACT

Systems and Methods for supporting carrier aggregation with different TDD configurations are proposed. In a first novel aspect, corresponding apparatus structure is described. In a second novel aspect, aggregation constraint is discussed. In a third novel aspect, transceiving mechanisms over multiple component carriers in DL/UL overlapped subframes are proposed. For simultaneous DL/UL transceiving, band combination indication methods are proposed, and HARQ feedback mechanisms are proposed. For non-simultaneous DL/UL transceiving, transceiving configuration methods are proposed, and the same HARQ feedback mechanisms are proposed. In a fourth novel aspect, CQI/RLM/RRM measurement mechanisms are proposed. In a fifth novel aspect, UE capability signaling mechanisms are proposed. The objective is to support flexible aggregation, to (Continued)

enhance DL data throughout, and to improve UL transmit power efficiency.

15 Claims, 13 Drawing Sheets

Related U.S. Application Data

(60) Provisional application No. 61/499,382, filed on Jun. 21, 2011.

(51) Int. Cl.
*H04W 72/08* (2009.01)
*H04L 5/00* (2006.01)

(52) U.S. Cl.
CPC ....... *H04L 5/1469* (2013.01); *H04W 72/0406* (2013.01); *H04W 72/0453* (2013.01); *H04W 72/082* (2013.01); *Y02D 70/1262* (2018.01)

(58) Field of Classification Search
USPC .......................................... 370/280, 329, 330
See application file for complete search history.

(56) References Cited

U.S. PATENT DOCUMENTS

| | | | | |
|---|---|---|---|---|
| 2009/0249153 | A1* | 10/2009 | Zhang | H04L 1/1887 714/748 |
| 2009/0257399 | A1 | 10/2009 | Kuo | 370/331 |
| 2010/0130217 | A1* | 5/2010 | Wu | H04W 48/08 455/450 |
| 2011/0134774 | A1 | 6/2011 | Pelletier et al. | 370/252 |
| 2011/0141952 | A1 | 6/2011 | Wang et al. | 370/294 |
| 2011/0256855 | A1* | 10/2011 | Wang | H04W 8/24 455/418 |
| 2011/0319069 | A1* | 12/2011 | Li | H04W 8/22 455/422.1 |
| 2012/0008557 | A1 | 1/2012 | Wu | 370/328 |
| 2012/0040687 | A1* | 2/2012 | Siomina | G01S 5/0205 455/456.1 |
| 2012/0087250 | A1 | 4/2012 | Song et al. | 370/242 |
| 2012/0092840 | A1 | 4/2012 | Yu et al. | 361/752 |
| 2012/0113866 | A1* | 5/2012 | Tenny | H04W 24/10 370/254 |
| 2012/0120854 | A1* | 5/2012 | Zhang | H04B 7/2656 370/280 |
| 2012/0184281 | A1 | 7/2012 | Kim et al. | 455/450 |
| 2012/0281600 | A1* | 11/2012 | Tseng | H04W 76/048 370/280 |
| 2012/0307744 | A1* | 12/2012 | Charbit | H04W 72/1205 370/329 |
| 2013/0100866 | A1 | 4/2013 | Yang et al. | 370/281 |
| 2013/0100891 | A1 | 4/2013 | Yang et al. | 370/328 |
| 2013/0250822 | A1* | 9/2013 | Yang | H04L 5/001 370/280 |
| 2013/0279377 | A1* | 10/2013 | Zhao | H04L 5/001 370/280 |
| 2013/0286883 | A1 | 10/2013 | Kim et al. | 370/252 |
| 2014/0080501 | A1* | 3/2014 | Lee | H04W 72/0453 455/454 |
| 2014/0092840 | A1* | 4/2014 | Zeng | H04L 1/1861 370/329 |

FOREIGN PATENT DOCUMENTS

| | | |
|---|---|---|
| CN | 101982997 A | 11/2010 |
| CN | 102075949 A | 12/2010 |
| CN | 102045763 A | 1/2011 |
| CN | 102076031 A | 1/2011 |
| EP | 2658303 A1 | 12/2010 |
| TW | 201021608 A1 | 11/2008 |
| WO | WO9856125 A1 | 6/1997 |
| WO | WO2011063244 A2 | 11/2009 |
| WO | WO2012145907 A1 | 4/2011 |

OTHER PUBLICATIONS

3GPP TSG RAN2#74 meeting, R2-113216, Intel Corporation, Support of Mixed Inter-Band TDD Configuration in Rel-11 CA. May 9-13, 2011, Barcelona, Spain (pp. 1-2).
3GPP TSG RAN WG2 Meeting 74, R2-112816, CATT, Consideration on Different TDD Configuration, May 9-13, 2011, Barcelona, Spain (pp. 1-2).
3GPP TSG-RAN WG2 Meeting #74, R2-112938, Renesas Mobile Europe, Operation Principles of CC Specific TDD Configuration, May 9-13, 2011 Barcelona, Spain (pp. 1-3).
3GPP TSG-RAN4 Meeting #62bis, R4-122712, CMCC, UE Capability to Support Simultaneous Transmission/Reception for TDD Inter-Band CA, May 21-25, 2012, Prague, Czech Republic (pp. 1-4).
Taiwan IPO, Office Action of TW patent application 101122017 dated May 21, 2014 (8 pages).
EPO, Office Action of the EP application 12803405 dated Nov. 14, 2014 (5 pages).
JPO, Office Action of the JP application 2014-513901 dated Nov. 18, 2014 (4 pages).
R2-112946 3GPP TSG-RAN WG2 Meeting #74; Nokia Siemens Networks et al., Cell Specific TDD Configuration with Inter-Band CA; Barcelona, Spain dated May 9-13, 2011 (4 pages).
R2-052387 3GPP TSG RAN WG2 meeting #48bis; Ericsson; Tx/Rx Frequency Separation Capability (FDD); Cannes, France dated Oct. 10-14, 2005 (19.
R4-082459 TSG-RAN Working Group 4 (Radio) meeting #48bis; Ericsson; Spurious Emission into Adjacent Bands; Edinburgh, Scotland dated Sep. 29 to Oct. 2, 2008 (7 pages).
R1-110283 3GPP TSG WG1 Meeting #63bis; Research in Motion UK Limited; Clarification of Rel-10 UE Category and MIMO Layer capability Definition; Dublin, Ireland dated Jan. 17-21, 2011 (4 pages).
R2-104183 3GPP TSG-RAN2#70bis meeting; Samsung; Overview of Common Configuration Parameters for CA; Stockholm, Sweden dated Jun. 28 to Jul. 2, 2010 (5 pages).
EPO, Search Report for the EP patent application 16162438.2 dated Jul. 11, 2016 (7 pages).
EPO, Search Report for the EP patent application 16162439.0 dated Jul. 20, 2016 (11 pages).
3GPP TSG-RAN WG2 Meeting #74, R2-112938, Renesas Mobile Europe, Operation Principles of CC Specific TDD Configuration, May 9-13, 2011 Barcelona, Spain (3 pages).

* cited by examiner

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 3

| CC | UL-DL CONFIG | SPP | SUBFRAME NUMBER | | | | | | | | | |
|---|---|---|---|---|---|---|---|---|---|---|---|---|
| | | | 0 | 1 | 2 | 3 | 4 | 5 | 6 | 7 | 8 | 9 |
| PCELL | 1 | 5ms | D | S | U | U | D | D | S | U | U | D |
| SCELL | 0 | 5ms | D | S | U | U | U | D | S | U | U | U |

— OVERLAPPING SUBFRAMES

FIG. 4

| CC | UL-DL CONFIG | SPP | SUBFRAME NUMBER | | | | | | | | | |
|---|---|---|---|---|---|---|---|---|---|---|---|---|
| | | | 0 | 1 | 2 | 3 | 4 | 5 | 6 | 7 | 8 | 9 |
| PCELL | 0 | 5ms | D | S | U | U | U | D | S | U | U | U |
| SCELL | 3 | 10ms | D | S | U | U | U | D | D | D | D | D |

FIG. 5

| UL-DL CONFIG | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

TDD HARQ FEEDBACK TIMETABLE

901

| PCELL\SCELL | 0 | 1 | 2 | 3 | 4 | 5 | 6 |
|---|---|---|---|---|---|---|---|
| 0 | YES | X | X | X | X | X | X |
| 1 | MAYBE | YES | X | X | X | X | YES |
| 2 | YES | YES | YES | X | X | X | YES |
| 3 | MAYBE | X | X | YES | X | X | YES |
| 4 | MAYBE | YES | X | YES | YES | X | YES |
| 5 | YES | YES | X | YES | YES | YES | YES |
| 6 | MAYBE | X | X | X | X | X | YES |

| YES | METHOD #1 |
| MAYBE | METHOD #5 |

| CC | UL-DL CONFIG | SUBFRAME NUMBER ||||||||||
| | | 0 | 1 | 2 | 3 | 4 | 5 | 6 | 7 | 8 | 9 |
|---|---|---|---|---|---|---|---|---|---|---|---|
| PCELL | 1 | - | - | 7, 6 | 4 | - | - | - | 7, 6 | 4 | - |
| SCELL | 0 |  | - | 6 | - | 4 |  | - | 6 | - | 4 |

DO NOT ALLOCATE DL RESOURCE IN SUBFRAME 0 AND 5 FOR SCELL
METHOD #2

ALWAYS ALLOCATE UL GRANT IN SUBFRAME 4 AND 9 FOR SCELL
METHOD #2A

HARQ ACK THROUGH PUCCH ON SCELL
METHOD #3

FIG. 10

| UL-DL CONFIG | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |

1101

| CC | UL-DL CONFIG | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| PCELL | 0 | - | - | 6 | HARQ-ACK | 4 | - | - | 6 | HARQ-ACK | 4 |
| SCELL | 1 | - | - | 7, 6 | 4 | / | - | - | 7, 6 | 4 | - |

| DOWNLINK ASSOCIATION SET INDEX FOR SCELL = 0 | | | | | | | | | | |
|---|---|---|---|---|---|---|---|---|---|---|
| PCELL UL-DL CONFIG | SUBFRAME NUMBER | | | | | | | | | |
| | 0 | 1 | 2 | 3 | 4 | 5 | 6 | 7 | 8 | 9 |
| 0 | - | - | 6 | - | 4 | - | - | 6 | - | 4 |
| 1 | - | - | 6 | 8 | - | - | - | 7 | 7 | - |
| 2 | - | - | 6, 7 | - | - | - | - | 6, 7 | - | - |
| 3 | - | - | 7, 11 | 7 | 4 | - | - | - | - | - |
| 4 | - | - | 12, 7 | 12, 7 | - | - | - | - | - | - |
| 5 | - | - | 12, 11, 7, 6 | - | - | - | - | - | - | - |
| 6 | - | - | 6 | 8 | 4 | - | - | 6 | - | - |

FIG. 12

| DOWNLINK ASSOCIATION SET INDEX FOR SCELL = 1 | | | | | | | | | | |
|---|---|---|---|---|---|---|---|---|---|---|
| PCELL UL-DL CONFIG | SUBFRAME NUMBER | | | | | | | | | |
| | 0 | 1 | 2 | 3 | 4 | 5 | 6 | 7 | 8 | 9 |
| 0 | - | - | 6, 3 | - | 4 | - | - | 6 | - | 5, 4 |
| 1 | - | - | 7, 6 | 4 | - | - | - | 7, 6 | 4 | - |
| 2 | - | - | 8, 7, 6 | - | - | - | - | 8, 7, 6 | - | - |
| 3 | - | - | 9, 7 | 9, 7 | 4, 5 | - | - | - | - | - |
| 4 | - | - | 12, 8, 11 | 8, 7, 4 | - | - | - | - | - | - |
| 5 | - | - | 13, 12, 8, 7, 11, 6 | - | - | - | - | - | - | - |
| 6 | - | - | 8 | 8, 4 | 8 | - | - | 7 | 7 | - |

FIG. 13

| DOWNLINK ASSOCIATION SET INDEX FOR SCELL = 2 | | | | | | | | | | |
|---|---|---|---|---|---|---|---|---|---|---|
| PCELL UL-DL CONFIG | SUBFRAME NUMBER | | | | | | | | | |
| | 0 | 1 | 2 | 3 | 4 | 5 | 6 | 7 | 8 | 9 |
| 0 | - | - | 6, 4 | - | 4, 5 | - | - | 6, 4 | - | 5, 4 |
| 1 | - | - | 7, 4 | 7, 4 | - | - | - | 7, 4 | 7, 4 | - |
| 2 | - | - | 8, 7, 4, 6 | - | - | - | - | 8, 7, 4, 6 | - | - |
| 3 | - | - | 11, 9, 4 | 9, 7, 4 | 4, 9 | - | - | - | - | - |
| 4 | - | - | 12, 11, 9, 8 | 8, 7, 5, 4 | - | - | - | - | - | - |
| 5 | - | - | 13, 12, 9, 8, 7, 4, 6, 11 | - | - | - | - | - | - | - |
| 6 | - | - | 7, 4 | 7, 4 | 4 | - | - | 6, 4 | 4 | - |

FIG. 14

| DOWNLINK ASSOCIATION SET INDEX FOR SCELL = 3 | | | | | | | | | | |
|---|---|---|---|---|---|---|---|---|---|---|
| PCELL UL-DL CONFIG | SUBFRAME NUMBER | | | | | | | | | |
|  | 0 | 1 | 2 | 3 | 4 | 5 | 6 | 7 | 8 | 9 |
| 0 | - | - | 6, 5, 4 | - | 4, 5 | - | - | 6 | - | 4 |
| 1 | - | - | 7, 4, 5 | 7, 4 | - | - | - | 7 | 7 | - |
| 2 | - | - | 7, 6, 5, 4 | - | - | - | - | 7, 6, 8 | - | - |
| 3 | - | - | 7, 6, 11 | 6, 5 | 5, 4 | - | - | - | - | - |
| 4 | - | - | 12, 11, 7, 6 | 6, 5, 4 | - | - | - | - | - | - |
| 5 | - | - | 12, 11, 7, 6, 5, 4, 13 | - | - | - | - | - | - | - |
| 6 | - | - | 7, 5 | 7, 5 | 4, 5 | - | - | 6 | - | - |

FIG. 15

| DOWNLINK ASSOCIATION SET INDEX FOR SCELL = 4 | | | | | | | | | | |
|---|---|---|---|---|---|---|---|---|---|---|
| PCELL UL-DL CONFIG | SUBFRAME NUMBER | | | | | | | | | |
|  | 0 | 1 | 2 | 3 | 4 | 5 | 6 | 7 | 8 | 9 |
| 0 | - | - | 7, 6, 5 | - | 6, 5 | - | - | 7, 6 | - | 5, 4 |
| 1 | - | - | 7, 5, 4 | 7, 5, 4 | - | - | - | 7, 6 | 4 | - |
| 2 | - | - | 8, 7, 6, 5 | - | - | - | - | 7, 6, 9, 8 | - | - |
| 3 | - | - | 11, 8, 4 | 8, 6, 4 | 4, 8 | - | - | - | - | - |
| 4 | - | - | 12, 8, 7, 11 | 6, 5, 4, 7 | - | - | - | - | - | - |
| 5 | - | - | 12, 11, 8, 7, 6, 5, 4, 13 | - | - | - | - | - | - | - |
| 6 | - | - | 7, 5 | 7, 5 | 4, 5 | - | - | 6 | 4 | - |

FIG. 16

| DOWNLINK ASSOCIATION SET INDEX FOR SCELL = 5 | | | | | | | | | | |
|---|---|---|---|---|---|---|---|---|---|---|
| PCELL UL-DL CONFIG | SUBFRAME NUMBER | | | | | | | | | |
| | 0 | 1 | 2 | 3 | 4 | 5 | 6 | 7 | 8 | 9 |
| 0 | - | - | 7, 6, 4 | - | 4, 7, 5 | - | - | 6, 4 | - | 5 |
| 1 | - | - | 4, 5, 7 | 4, 7 | - | - | - | 7, 6 | 4, 5 | - |
| 2 | - | - | 8, 7, 6, 5, 4 | - | - | - | - | 7, 6, 4, 8 | - | - |
| 3 | - | - | 11, 9, 8 | 4, 6, 8 | 4, 6, 8 | - | - | - | - | - |
| 4 | - | - | 12, 11, 9, 8, 7 | 7, 6, 5, 4 | - | - | - | - | - | - |
| 5 | - | - | 12, 11, 9, 8, 7, 6, 5, 4, 13 | - | - | - | - | - | - | - |
| 6 | - | - | 7, 5 | 7, 5 | 4, 5 | - | - | 6, 4 | 4 | - |

FIG. 17

| DOWNLINK ASSOCIATION SET INDEX FOR SCELL = 6 | | | | | | | | | | |
|---|---|---|---|---|---|---|---|---|---|---|
| PCELL UL-DL CONFIG | SUBFRAME NUMBER | | | | | | | | | |
| | 0 | 1 | 2 | 3 | 4 | 5 | 6 | 7 | 8 | 9 |
| 0 | - | - | 6 | - | 4, 5 | - | - | 6 | - | 4 |
| 1 | - | - | 7 | 7, 4 | - | - | - | 7 | 7 | - |
| 2 | - | - | 7, 6 | - | - | - | - | 7, 6, 8 | - | - |
| 3 | - | - | 11, 6 | 8, 4 | 4 | - | - | - | - | - |
| 4 | - | - | 12, 11 7 | 8, 4 | - | - | - | - | - | - |
| 5 | - | - | 12, 11, 7, 6, 13 | - | - | - | - | - | - | - |
| 6 | - | - | 7 | 7 | 4 | - | - | 6 | 9 | - |

FIG. 18

| CC | UL-DL CONFIG | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| PCELL | 0 | D | S | U | U | U | D | S | U | U | U |
| SCELL | 1 | D | S | U | U | ☒ | D | S | U | U | ☒ |

| CC | UL-DL CONFIG | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| PCELL | 1 | D | S | U | U | D | D | S | U | U | D |
| SCELL | 0 | D | S | U | U | ☒ | D | S | U | U | ☒ |

```
                                         ╱─ 2401
TDD-Config Information Element ─╱

TDD-Config ::=              SEQUENCE {
        subframeAssignment          ENUMERATED {
                                        sa0, sa1, sa2, sa3, sa4, sa5, sa6},
        specialSubframePatterns     ENUMERATED {
                                        ssp0, ssp1, ssp2, ssp3, ssp4, ssp5, ssp6, ssp7, ssp8}
}

╱─ 2402
SystemInformationBlockType1 Message ─╱

SystemInformationBlockType1 :: =    SEQUENCE {
...
        tdd-Config                          TDD-Config     OPTIONAL,
...
}
```

SYSTEMS AND METHODS FOR DIFFERENT TDD CONFIGURATIONS IN CARRIER AGGREGATION

CROSS REFERENCE TO RELATED APPLICATIONS

This application is a continuation, and claims priority under 35 U.S.C. § 120 from nonprovisional U.S. patent application Ser. No. 13/527,286, entitled "Systems and Methods for Different TDD Configurations in Carrier Aggregation," filed on Jun. 19, 2012, the subject matter of which is incorporated herein by reference. Application Ser. No. 13/527,286, in turn, claims priority under 35 U.S.C. § 119 from U.S. Provisional Application No. 61/499,382, entitled "Systems and Methods for different TDD configurations in carrier aggregations," filed on Jun. 21, 2011, the subject matter of which is incorporated herein by reference.

TECHNICAL FIELD

The present invention relates generally to wireless communication systems and, more particularly, to Time Division Duplex (TDD) configuration in LTE systems with carrier aggregation.

BACKGROUND

In wireless communication systems, such as defined by 3GPP Long Term Evolution (LTE/LTE-A) specification, user equipments (UE) and base stations (eNodeB) communicate with each other by sending and receiving data carried in radio signals according to a predefined radio frame format. Typically, the radio frame format contains a sequence of radio frames, each radio frame having the same frame length with the same number of subframes. The subframes are configures to perform uplink (UL) transmission or downlink (DL) reception in different Duplexing methods. Time-division duplex (TDD) is the application of time-division multiplexing to separate transmitting and receiving radio signals. TDD has a strong advantage in the case where there is asymmetry of the uplink and downlink data rates. Seven different TDD configurations are provided in LTE/LTE-A to support different DL/UL traffic ratios for different frequency bands. Specifically, each radio frame contains ten subframes, and each subframe is defined to be an uplink subframe or a downlink subframe for each of the TDD configuration.

In 3GPP LTE/LTE-A systems, one of the promising technologies to enhance the data throughput is carrier aggregation (CA), where multiple component carriers (CCs) are aggregated and jointly used for transmission to/from a single device. In contiguous carrier aggregation, two or more contiguous CCs in a frequency band are aggregated. In non-contiguous carrier aggregation, two or more non-contiguous CCs are aggregated. For non-contiguous CA, there are intra-band CA and inter-band CA. In intra-band carrier aggregation, two or more non-contiguous CCs in the same frequency band are aggregated. In inter-band carrier aggregation, two or more non-contiguous CCs in different frequency bands are aggregated.

In Rel-11 CA enhancement work item (RP-110451), it is agreed to support inter-band CA such that multiple CCs in different bands having different TDD configurations can be aggregated. The objective of inter-band CA is to support flexible aggregation, to enhance DL data throughout, and to improve UL transmit power efficiency. Accordingly, potential issues on carrier aggregation with different TDD configurations are investigated and associated solutions are proposed.

SUMMARY

Systems and Methods for supporting carrier aggregation with different TDD configurations are proposed. In a first novel aspect, corresponding apparatus structure is described. In a second novel aspect, aggregation constraint is discussed. In a third novel aspect, transceiving mechanisms over multiple component carriers in DL/UL overlapped subframes are proposed. For simultaneous DL/UL transceiving, band combination indication methods are proposed, and HARQ feedback mechanisms are proposed. For non-simultaneous DL/UL transceiving, transceiving configuration methods are proposed, and the same HARQ feedback mechanisms are proposed. In a fourth novel aspect, CQI/RLM/RRM measurement mechanisms are proposed. In a fifth novel aspect, UE capability signaling mechanisms are proposed.

The objective of the proposed methods is to support flexible aggregation, to enhance DL data throughout, and to improve UL transmit power efficiency. First, it is desirable to support flexible aggregation on different band configuration. Different TDD configurations can be used to support the coexistence of TD-SCDMA and TD-LTE without introducing constraints on TD-LTE in the other band. For example, an operator has already deployed TD-SCDMA in band x, and the operator wants to deploy TD-LTE in the same band. By considering the interference between two systems, TDD configuration in TD-LTE in band x should match up TD-SCDMA's configuration, e.g., TDD configuration 2. If different TDD configurations in carrier aggregation are not supported, then TD-LTE in band y, which aggregates TD-LTE in band x, can only use TDD configuration 2, which is quite limited. Second, with flexible aggregation, higher frequency band DL can be aggregated with lower frequency band UL, which not only the DL data throughput can be enhanced, but also UL transmit power can be more efficient. For example, in a higher frequency band (e.g., 2.4 GHz), TDD configurations with more DL subframes is configured. On the other hand, in a lower frequency band (e.g., 700 MHz), TDD configurations with more UL subframes is configured.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates TDD mode uplink-downlink configurations in an LTE/LTE-A system.

FIG. 4 illustrates an example of carrier aggregation with aggregation constraint.

FIG. 5 illustrates an example of carrier aggregation without aggregation constraint.

FIG. 9 illustrates a first method of HARQ feedback in simultaneous DL/UL transceiving.

FIG. 10 illustrates other methods of HARQ feedback in simultaneous DL/UL transceiving.

FIG. 11 illustrates a fifth method of HARQ feedback in simultaneous DL/UL transceiving.

FIG. 12 illustrates a first example of HARQ feedback timetable in simultaneous DL/UL transceiving with TDD configuration 0 in SCELL.

FIG. 13 illustrates a second example of HARQ feedback timetable in simultaneous DL/UL transceiving with TDD configuration 1 in SCELL.

FIG. 14 illustrates a third example of HARQ feedback timetable in simultaneous DL/UL transceiving with TDD configuration 2 in SCELL.

FIG. 15 illustrates a fourth example of HARQ feedback timetable in simultaneous DL/UL transceiving with TDD configuration 3 in SCELL.

FIG. 16 illustrates a fifth example of HARQ feedback timetable in simultaneous DL/UL transceiving with TDD configuration 4 in SCELL.

FIG. 17 illustrates a sixth example of HARQ feedback timetable in simultaneous DL/UL transceiving with TDD configuration 5 in SCELL.

FIG. 18 illustrates a seventh example of HARQ feedback timetable in simultaneous DL/UL transceiving with TDD configuration 6 in SCELL.

DETAILED DESCRIPTION

Reference will now be made in detail to some embodiments of the invention, examples of which are illustrated in the accompanying drawings.

Figure 1:
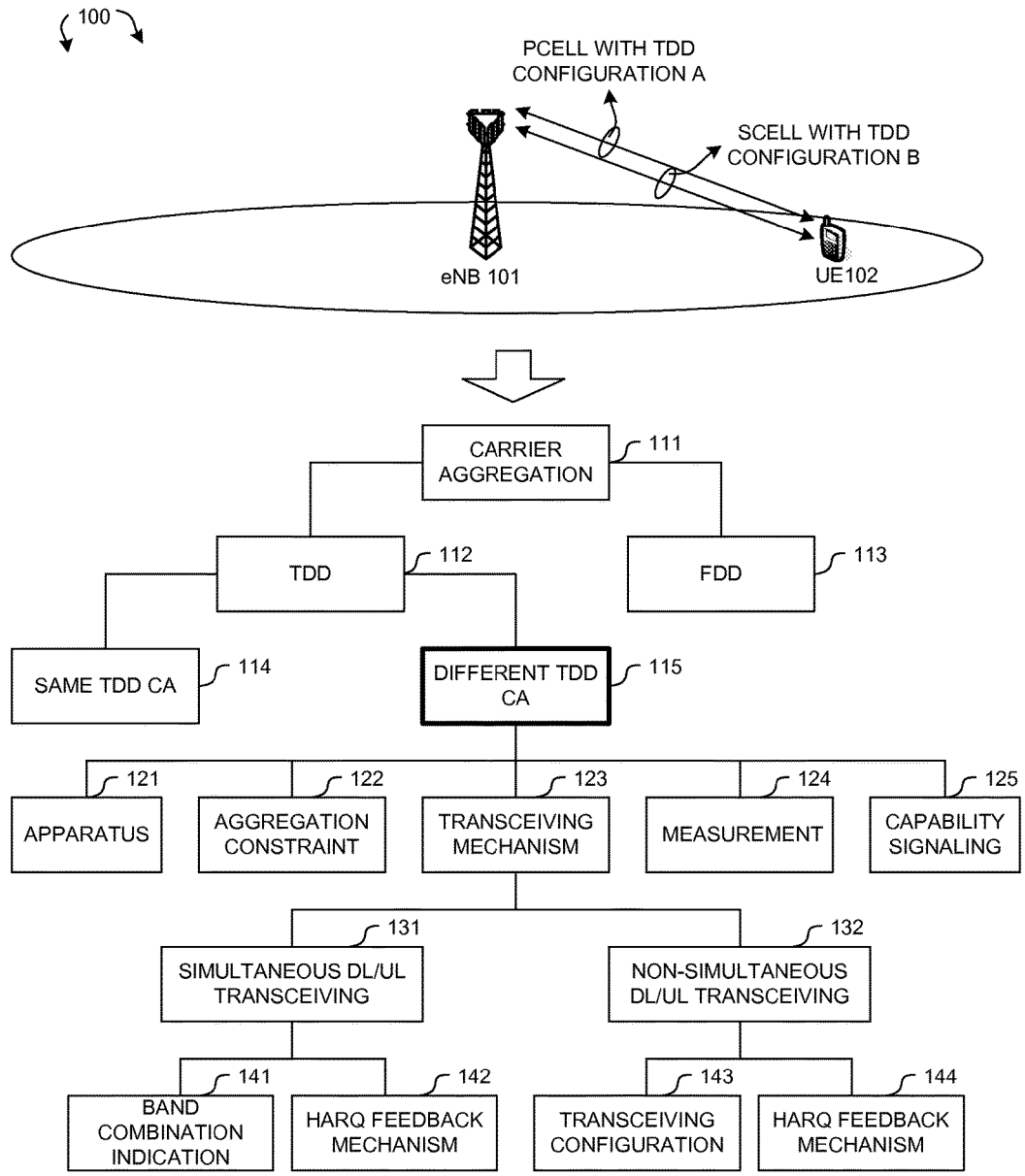
FIG. 1 illustrates a system and method of supporting different TDD configurations in carrier aggregation in accordance with one novel aspect.

FIG. 1 illustrates a system and method of supporting different TDD configurations in carrier aggregation in accordance with one novel aspect. For illustrative purposes, the disclosed embodiment operates according to 3GPP LTE protocol. Wireless communication system 100 comprises an eNodeB (eNB) 101 and a user equipment (UE) 102, both support carrier aggregation (CA) over multiple component carriers (CCs). In the example of FIG. 1, a primary cell (PCELL) is configured for UE 102 over a primary component carrier CC1, and a secondary cell (SCELL) is configured for UE 102 over a secondary component carrier CC2. On one novel aspect, carrier aggregation is supported for TDD mode with different TDD configurations in different CCs. For example, PCELL is configured with a first TDD configuration A, while SCELL is configured with a second TDD configuration B.

In wireless communication system 100, carrier aggregation (e.g., box 111) may be supported in Time Division Duplex (TDD) mode (e.g., box 112) or Frequency Division Duplex (FDD) mode (e.g., box 113). For TDD mode, carrier aggregation may be supported with same TDD configuration (e.g., box 114), or with different TDD configurations (e.g., box 115). Carrier aggregation with different TDD configurations is the focus of the present invention. Especially for inter-band carrier aggregation where two or more non-contiguous CCs in different frequency bands are aggregated, five different issues are considered in the present invention. Box 121 indicates a first issue of physical apparatus structure. Box 122 indicates a second issue of aggregation constraint. Box 123 indicates a third issue of transceiving mechanism. Box 124 indicates a fourth issue of CQI/RLM/RRM measurement. Finally, box 125 indicates a fifth issue of capability signaling. For transceiving mechanism, both simultaneous DL/UL transceiving (e.g., box 131) and non-simultaneous DL/UL transceiving (e.g., box 132) are considered. Moreover, for simultaneous DL/UL transceiving, the issues of band combination indication (e.g., box 141) and HARQ feedback mechanism (e.g., box 142) are considered. Similarly, for non-simultaneous DL/UL transceiving, the issues of transceiving configuration (e.g., box 143) and HARQ feedback mechanism (e.g., box 144) are considered. Each of the considered issues is now discussed below with associated solutions.

(1) Apparatus

First, in order to support carrier aggregation with different TDD configurations, a UE may need to be equipped with multiple radio frequency (RF) transceiver modules. For example, a UE may equip with two RF transceiver modules in order to support aggregating two component carriers with different TDD configurations, where each RF transceiver module operates in a corresponding TDD configuration mode. While a single RF may be sufficient for intra-band carrier aggregation, multiple RFs are particularly necessary for inter-band carrier aggregation. For inter-band CA, because the carrier frequencies for different CCs may be very far away from each other, it is difficult for a single RF transceiver module to process radio signals with very different frequencies.

Figure 2A:
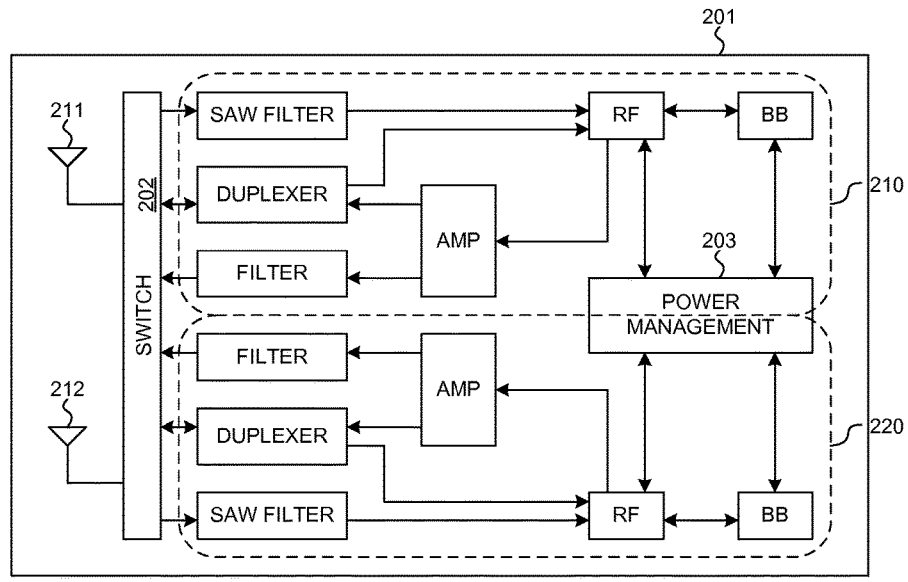
FIGS. 2A and 2B are simplified block diagrams of a user equipment in accordance with one novel aspect.

FIG. 2A is a simplified block diagram of one embodiment of a user equipment UE 201 in accordance with one novel aspect. UE 201 comprises a first antenna 211 coupled to a first RF transceiver module 210 via switch 202, a second antenna 212 coupled to a second RF transceiver module 220 via switch 202. RF transceiver modules 210 and 220 each comprises a SAW filter, a duplexer filter, a filter, an amplifier, an radio frequency (RF) module, and a baseband (BB) module. The two RF transceiver modules share the same power management module 203. In one example, the first RF transceiver 210 processes radio signals for a first CC1 having a first TDD configuration, while the second RF transceiver 220 processes radio signals for a second CC2 having a second TDD configuration. For inter-band CA, CC1 and CC2 may belong to different frequency bands.

Figure 2B:
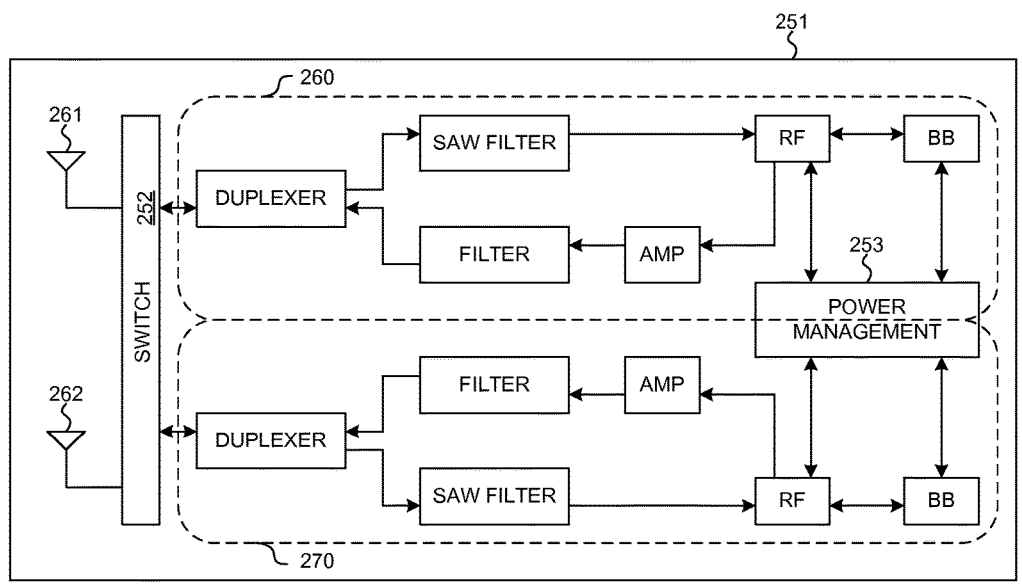

FIG. 2B is a simplified block diagram of another embodiment of a user equipment UE 251 in accordance with one novel aspect. UE 251 comprises a first antenna 261 coupled to a first RF transceiver module 260 via switch 252, a second antenna 262 coupled to a second RF transceiver module 270 via switch 252. RF transceiver modules 260 and 270 each comprises a SAW filter, a duplexer filter, a filter, an amplifier, an radio frequency (RF) module, and a baseband (BB) module. The two RF transceiver modules share the same power management module 253. In one example, the first RF transceiver 220 processes radio signals for a first CC1 having a first TDD configuration, while the second RF transceiver 270 processes radio signals for a second CC2 having a second TDD configuration. For inter-band CA, CC1 and CC2 may belong to different frequency bands.

(2) Aggregation Constraint

In LTE/LTE-A systems, seven different TDD configurations are provided to support different DL/UL traffic ratios. FIG. 3 illustrates TDD mode uplink-downlink configurations in an LTE/LTE-A system. In the example of Table 301, each radio frame contains ten subframes, D indicates a DL subframe, U indicates an UL subframe, and S indicates a Special subframe/Switch point (SP). Each SP contains a DwPTS (Downlink pilot time slot), a GP (Guard Period), and an UpPTS (Uplink pilot time slot). DwPTS is used for normal downlink transmission and UpPTS is used for uplink channel sounding and random access. DwPTS and UpPTS are separated by GP, which is used for switching from DL to UL transmission. The length of GP needs to be large enough to allow the UE to switch to the timing advanced uplink transmission.

Among the seven TDD configurations, four of them (e.g., TDD configurations 0, 1, 2, and 6) are with SP periodicity (SPP) of 5 ms, and three of them (e.g., TDD configurations 3, 4, and 5) are with SP periodicity (SPP) of 10 ms. In addition, each TDD configuration is provided with predefined DL, UL, and SP subframes. For example, under TDD configuration 0, subframe 0 is a DL subframe for DL transmission, subframe 1 is an SP subframe such that DL subframe can be properly switched to UL subframe, subframes 2-4 are UL subframes for UL transmission, subframe 5 is another DL subframe, subframe 6 is another SP subframe, and subframes 7-9 are UL subframes.

When multiple CCs with different TDD configurations are aggregated, the second issue is whether aggregation constraint is necessary. In one embodiment, aggregation is performed between CCs with the same SP periodicity (SPP). FIG. 4 illustrates an example of carrier aggregation with such aggregation constraint. In the example of FIG. 4, one CC having SPP 5 ms (e.g., PCELL with TDD configuration 1) aggregates with another CC having SPP of 5 ms (e.g., SCELL TDD configuration 0). In another embodiment, aggregation is performed between CCs with different SP periodicity (SPP). FIG. 5 illustrates an example of carrier aggregation without any aggregation constraint. In the example of FIG. 5, one CC having SPP of 5 ms (e.g., PCELL with TDD configuration 0) aggregates with another CC having SPP of 10 ms (e.g., SCELL with TDD configuration 3).

(3) Transceiving Mechanism

To support carrier aggregation with different TDD configurations, the DL receptions may overlap with UL transmissions. The third issue of transceiving mechanism is considered for both simultaneous DL/UL transceiving and non-simultaneous DL/UL transceiving.

Figure 6A:
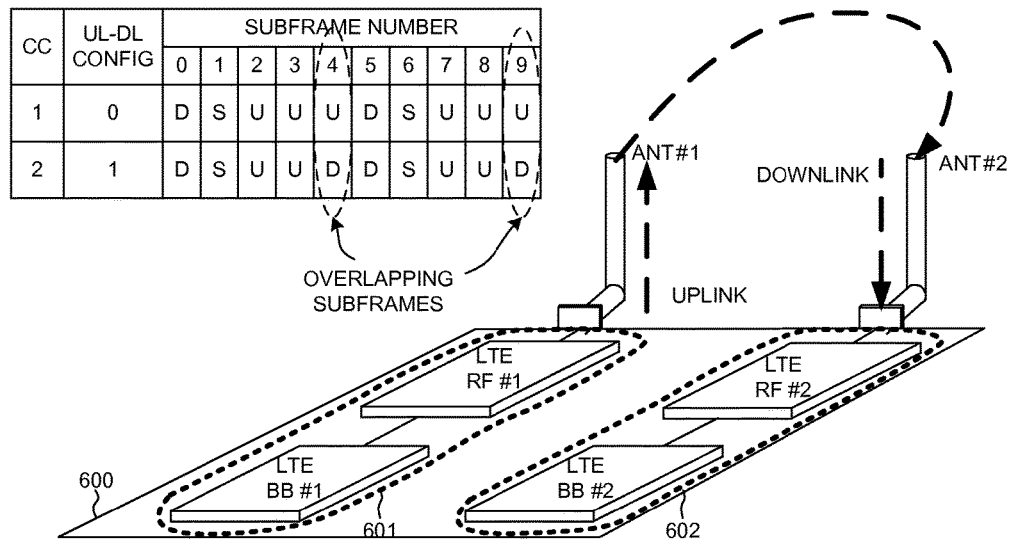
FIG. 6A illustrates simultaneous DL reception and UL transmission in overlapping DL and UL subframes of multiple CCs with different TDD configurations.

FIG. 6A illustrates simultaneous DL reception and UL transmission in overlapping DL and UL subframes of multiple CCs with different TDD configurations for user equipment UE 600. UE 600 is equipped with a first LTE RF transceiver module 601 and a second LTE RF transceiver module 602. RF transceiver module 601 comprises LTE radio frequency module RF#1 and baseband module BB#1, and RF transceiver module 602 comprises LTE radio frequency module RF#2 and baseband module BB#2. RF#1, BB#1, and ANT#1 are used for transmitting and receiving radio signals over a first component carrier CC1. RF#2, BB#2, and ANT#2 are used for transmitting and receiving radio signals over a second component carrier CC2. In the example of FIG. 6A, CC1 is configured with TDD configuration 0 and CC2 is configured with TDD configuration 1. Therefore, for overlapping subframes (e.g., subframe 4 and subframe 9), RF#1 performs transmitting (uplink) while RF#2 performs simultaneous receiving (downlink).

Figure 6B:
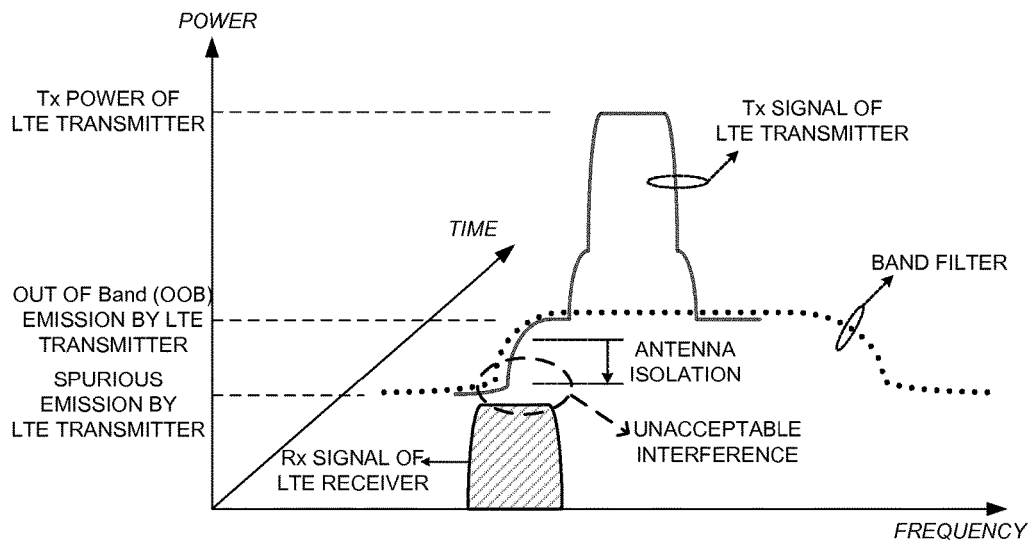
FIG. 6B illustrates interference to DL reception from simultaneous UL transmission.

FIG. 6B illustrates interference to DL reception from simultaneous UL transmission with respect to FIG. 6A. In the example of FIG. 6B, the LTE transmitter belongs to LTE RF #1 of UE 600, and the LTE receiver belongs to LTE RF #2 of UE 600, both are co-located in the same device platform (i.e., in-device). The transmitting (TX) signal by RF#1 over CC1 is very close to the receiving (RX) signal for RF#2 over CC2 in frequency domain. The out of band (OOB) emission and spurious emission resulted by imperfect TX filter and RF design of RF#1 may be unacceptable to RF#2. For example, the TX signal power level by RF#1 may be still higher (e.g. 60 dB higher before filtering) than RX signal power level for RF#2 even after the filtering (e.g., after 50 dB suppression).

(3.1) Band Combination Indication (Simultaneous DL/UL)

Figures 7, 8:
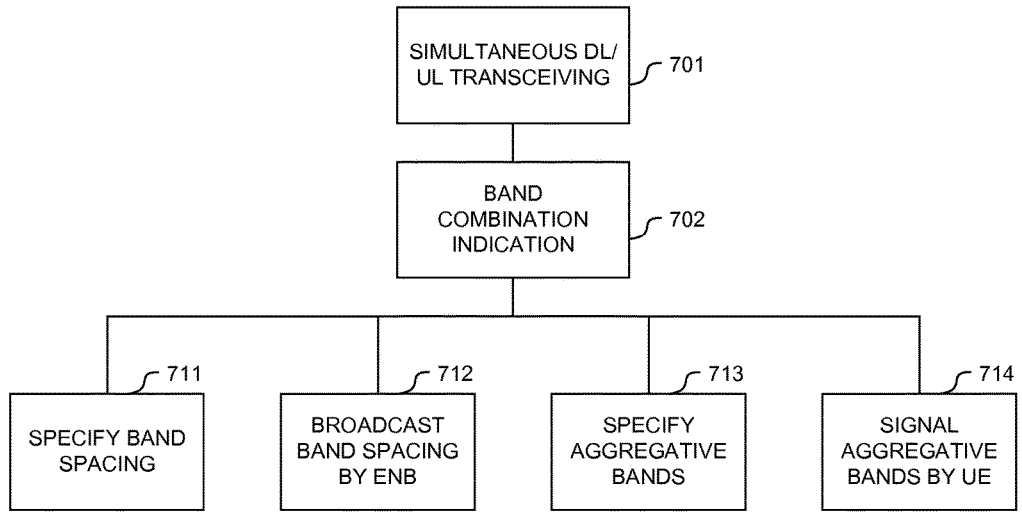
FIG. 7 illustrates embodiments of indicating band combination for simultaneous DL/UL transceiving.
FIG. 8 illustrates TDD mode HARQ feedback timetable in an LTE/LTE-A system.

From the above illustration, it can be seen that if simultaneous DL reception and UL transmission are allowed in the overlapping subframes, then the UL transmission may interfere with the DL reception if the band spacing of aggregating bands over multiple CCs is not large enough. To avoid this kind of in-device interference, proper band combination indication should be specified. There are various methods of indicating proper band combination. FIG. 7 illustrates different embodiments of indicating band combination (e.g., depicted by box 702) for simultaneous DL/UL transceiving (e.g., depicted by box 701) over multiple CCs.

In a first method, as depicted by box 711, band spacing may be specified in the LTE specification. Larger band spacing may be needed for higher frequency aggregate TDD bands, and smaller band spacing may be needed for lower frequency aggregate TDD bands. In one example, if CC1 operating at frequency band of 700 MHz is aggregated with CC2 operating at 800 MHz, then the band spacing needed to avoid interference may be x. In another example, if CC1 operating at frequency band of 2.3 GHz is aggregated with CC2 operating at 2.4 GHz, then the band spacing needed to avoid interference may be y. The various band spacing requirements may be specified in the LTE specification for simultaneous DL/UL transceiving.

In a second method, as depicted by box 712, band spacing requirements may be broadcasted via system information blocks. For example, the various band spacing requirements are broadcasted in system information block 1 (SIB1) by the eNBs. If aggregative TDD frequency bands with different TDD configuration are not clearly specified in the LTE specification, then the minimum requirement of band spacing of each TDD band should be broadcasted by the eNBs. Based on such requirements, UE can indicate if it can support this kind of aggregation by its filter capability to the network.

In a third method, as depicted by box 713, aggregative TDD frequency bands may be specified in the LTE specification. For example, multiple CCs operate at various frequency bands with different TDD configurations are aggregated. The LTE specification may specify that TDD band x and TDD band y are aggregative, and TDD band z and TDD band w are aggregative. The LTE specification may include a lookup table that indicates the combination of all possible TDD band combinations.

In a fourth method, as depicted by box 714, aggregative TDD frequency bands supported by each UE may be explicitly signaled via capability signaling. The level of interference caused to DL reception by simultaneous UL transmission is associated with the RF transceiving capability (e.g., RF filter capability and RF design) of each UE. Therefore, a UE first determines the aggregative bands that it can support based on its RF transceiving capability. In UE capability report, the UE then indicates to an eNB the supported TDD band aggregation for different TDD configurations. The eNB then configures different TDD configurations to the UE if both the UE and the system support.

(3.2) HARQ Feedback Mechanism (Simultaneous DL/UL)

TDD HARQ feedback timing of different configuration is strictly specified in 3GPP specification. Once the eNB does not receive ACK/NACK on the expected subframe/slot, retransmission mechanism might be triggered. In general, HARQ feedback information may be transmitted via physical uplink control channel (PUCCH) or via physical uplink shared channel (PUSCH). For UE that does not support simultaneous PUCCH and PUSCH, if UL data is transmitted, then PUSCH is used for HARQ feedback. If there is no uplink grant, then PUCCH is used for HARQ feedback. On the other hand, for UE that supports simultaneous PUCCH and PUSCH, HARQ feedback is transmitted on PUCCH, and UL data is transmitted on PUSCH.

FIG. 8 illustrates a TDD mode HARQ feedback timetable in an LTE/LTE-A system. In table 801, each uplink subframe may be associated with a list of corresponding downlink subframe indices for which HARQ feedback is reported to eNB. The list of association downlink subframe indices is represented by set $K=\{k_0, k_1 \ldots k_{M-1}\}$. In one example, for TDD configuration 0, uplink subframe 9 is associated with a list of downlink subframe indices represented by $K=\{k_0=4\}$, which indicates that uplink subframe 9 is scheduled to report HARQ feedback for the downlink subframe that is 4 subframes before uplink subframe 9 (e.g., downlink subframe 5). In another example, for TDD configuration 5, uplink subframe 2 is associated with a list of downlink subframe indices represented by $K=\{k_0=13, k_1=12, k_2=9, k_3=8, k_4=7, k_5=5, k_6=4, k_7=11, k_8=6\}$, which indicates that uplink subframe 2 is scheduled to report HARQ feedback for the downlink subframes that are 13, 12, 9, 8, 7, 5, 4, 11, and 6 subframes before subframe 2 (e.g., downlink subframes 9, 8, 5, 4, 3, 1, 0, and 6).

In Rel-10 TDD CA, only intra-band carrier aggregation is supported. TDD configuration is identical in the intra-band CA. HARQ feedbacks for PCELL and SCELL are scheduled at the same subframes, and are sent through PCELL. In Rel-11 TDD CA, however, inter-band carrier aggregation is supported. TDD configurations may be different in the inter-band CA (e.g., PCELL may have a different TDD configuration from SCELL). Consequently, the DL/UL in PCELL may overlap with the UL/DL in SCELL in some subframes. Therefore, HARQ feedbacks for PCELL may be scheduled at different subframes from HARQ feedbacks for SCELL under table 801.

Referring back to FIG. 4, PCELL is configured with TDD configuration 1, and SCELL is configured with TDD configuration 0. It can be seen that the DL reception in PCELL is overlapped with the UL transmission in SCELL in subframes 4 and 9. In these overlapping subframes, conflict might occur when HARQ feedback is expected in SCELL but PCELL does not have the UL resources (i.e., no PUCCH/PUSCH in PCELL). For example, HARQ is expected in SCELL in subframe 4 (uplink). However, PCELL in subframe 4 is a downlink subframe thus does not have PUCCH. In addition, there is no uplink data for SCELL in subframe 4, thus there is no PUSCH for SCELL. In such a scenario, there is no way to transmit HARQ feedback on SCELL. Various methods are proposed to solve the above-illustrated HARQ feedback problem on SCELLs.

FIG. 9 illustrates a first method (Method #1) of HARQ feedback in simultaneous DL/UL transceiving. Method #1 adopts restricted combination of TDD configurations for PCELL and SCELL. The PCELL-SCELL TDD configuration combinations are limited such that the set of UL subframe indices in SCELLs is always a subset of the set of UL subframe indices in PCELL. In addition, the set of UL subframe indices in SCELLs is always a subset of the set of UL subframe indices in PCELL that performs HARQ feedback according to the TDD HARQ feedback timetable 801 in FIG. 8. As a result, PCELL will always have the UL resource for SCELL HARQ feedback so that the SCELL HARQ timing can follow the SCELL SIB1 HARQ timing.

Table 901 in FIG. 9 lists valid PCELL-SCELL TDD configuration combinations. Each box marked with "YES" indicates valid PCELL-SCELL TDD configuration combination. For example, if PCELL has TDD configuration 0, then the valid TDD configurations for SCELL are 0, 2, and 5, and TDD configurations 1, 3, 4, and 6 are invalid. According to table 301 in FIG. 3, the set of UL subframe indices in PCELL is $\{2, 3, 4, 7, 8, 9\}$. According to table 801 in FIG. 8, the set of UL subframe indices in PCELL for HARQ feedback is $\{2, 4, 7, 9\}$. For SCELL with TDD configuration 1, the set of UL subframe indices is $\{2, 3, 7, 8\}$, which is not a subset of $\{2, 4, 7, 9\}$, thus not a valid combination. For SCELL with TDD configuration 2, the set of UL subframe indices is $\{2, 7\}$, which is a subset of $\{2, 4, 7, 9\}$, thus a valid combination. The advantage of Method #1 is that simple modification is needed for Rel-11 to avoid HARQ feedback conflict. However, the constraint will eliminate up to 60% of all possible PCELL-SCELL combinations, giving the system very little flexibility.

FIG. 10 illustrates additional methods (e.g., Method #2 and Method #3) of HARQ feedback in simultaneous DL/UL transceiving. Method #2 adopts smart scheduling, where SCELL DL resource is scheduled by eNB if and only if PCELL has the corresponding UL resource for SCELL HARQ feedback. Otherwise, DL resource on SCELL should not be allocated. Table 1001 in FIG. 10 illustrates one example of such smart scheduling. In the example of FIG. 10, PCELL has TDD configuration 1 and SCELL has TDD configuration 0. According to the HARQ feedback timetable 801 in FIG. 8, SCELL needs to transmit HARQ feedback in UL subframe 4 for DL subframe 0 (e.g., subframe 0 is the DL subframe that is 4 subframes before UL subframe 4). Similarly, HARQ feedback is to be transmitted in UL subframe 9 for DL subframe 5. The corresponding PCELL subframe 4 and subframe 9, however, are downlink subframes and do not have UL resource for HARQ feedback transmission. Therefore, applying smart scheduling, SCELL DL resources for DL subframe 0 and subframe 5 are NOT scheduled. Consequently, there is no need for HARQ feedback in UL subframe 4 and subframe 9.

Method #2A is a variation of the above-illustrated smart scheduling, where eNB always schedule UL grant for SCELL in the DL/UL overlap subframes where PCELL is in DL and SCELL is in UL and HARQ feedback for SCELL should be transmitted. Table 1001 in FIG. 10 also illustrates one example of such smart scheduling. As explained above with respect to Method #2, SCELL is scheduled to transmit HARQ feedback in subframe 4 and subframe 9. The corresponding PCELL subframe 4 and subframe 9, however, do not have UL resources for HARQ feedback transmission. Therefore, applying smart scheduling, eNB always schedule UL grant for SCELL in subframe 4 and subframe 9 such that HARQ feedback for SCELL can be transmitted (e.g., through PUSCH with HARQ ACK/NACK piggyback).

In general, if PCELL does not have the UL resource for HARQ feedback on SCELL, then HARQ feedback on SCELL can be transmitted on SCELL. This is referred to as Method #3 of HARQ feedback in simultaneous DL/UL transceiving. For example, HARQ feedback may be transmitted through PUCCH on SCELL. When there are more than one active SCELL, only one SCELL that is prioritized is used for HARQ feedback. The prioritization can be determined by carrier index field (CIF) (e.g., the component carrier with smaller CIF holds higher priority), and/or RRC configuration (e.g., priority order determined by RRC signaling). The advantage of Method #3 is flexible combination of TDD configuration with no impact on the efficiency of DL throughput. However, eNB would have to figure out whether a terminal is sending HARQ feedback through PCELL or SCELL by looking at its active configurations.

A fourth method (Method #4) of HARQ feedback in simultaneous DL/UL transceiving is to transmit HARQ feedback on the corresponding cell. That is, HARQ feedback for PCELL is transmitted on PCELL, and HARQ feedback for SCELL is transmitted on the same SCELL. In order to do that, there may be parallel PUCCHs for HARQ feedback on different component carriers. Method #4 provides high flexibility in terms of PCELL-SCELL TDD configuration combination (e.g., any TDD configuration combination is possible) without affecting the efficiency of DL resource allocation.

FIG. 11 illustrates a fifth method (Method #5) of HARQ feedback in simultaneous DL/UL transceiving. Under Method #5, when PCELL is configured with TDD configuration 0, HARQ feedback transmission is allowed on subframes 3 and 8, which were originally designated for UL transmission without HARQ feedback resource. As illustrated in table 1101 in FIG. 11, in the original HARQ timetable for TDD configuration 0, no HARQ feedback is scheduled in subframes 3 and 8. In the new HARQ timetable 1102 for TDD configuration 0, HARQ feedback transmission is allowed in subframes 3 and 8. This method is a relatively easy modification on eNB.

Method #5 is beneficial to Method #1, because it creates more possible PCELL-SCELL TDD configuration combinations (e.g., from 40% to 50%). Referring back to FIG. 9, each box marked with "MAYBE" indicates valid PCELL-SCELL TDD configuration combination only if Method #5 is also applied in addition to Method #1. When PCELL has TDD configuration 0, all TDD configurations for SCELL become valid when Method #5 is applied. For example, under Method #1, TDD configuration 1 was invalid for SCELL when PCELL has TDD configuration 0. Under Method #1, the set of UL subframe indices in PCELL for HARQ feedback is {2, 4, 7, 9}. For SCELL with TDD configuration 1, the set of UL subframe indices is {2, 3, 7, 8}, which is not a subset of {2, 4, 7, 9}, thus not a valid TDD combination. Under Method #1 and Method #5, the set of UL subframe index in PCELL for HARQ feedback becomes {2, 3, 4, 7, 8, 9}. As a result, the set of UL subframe index {2, 3, 7, 8} is a subset of UL subframe index {2, 3, 4, 7, 8, 9}, thus a valid TDD combination.

Method #5 is also beneficial to Method #2 when TDD configuration 0 is used by PCELL because it allows more DL resource allocation for SCELL. As illustrated in table 1102 of FIG. 11, PCELL has TDD configuration 0 and SCELL has TDD configuration 1. According to the original HARQ timetable, uplink subframe 8 is scheduled to report HARQ feedback for downlink subframe 4 on SCELL. Because the corresponding PCELL subframe 8 does not have UL resource for HARQ feedback transmission, under Method #2, SCELL DL resources for DL subframe 4 is NOT scheduled. However, under Method #5, PCELL subframe 8 has UL resource for HARQ feedback. Consequently, DL resources can be allocated for DL subframe 4 for SCELL.

In addition to the above-illustrated methods, a sixth method (Method #6) of HARQ feedback in simultaneous DL/UL transceiving is to define new SCELL UL HARQ ACK/NACK resource scheduling. In general, SCELL HARQ feedback is dynamically scheduled according to PCELL's UL HARQ ACK/NACK resource allocation based on PCELL's TDD configuration. Method #6 provides two general guidelines for dynamic allocation of SCELL HARQ feedback in subframe n. The first guideline is G1, which is to transmit HARQ ACK/NACK four subframes after the reception of the corresponding DL subframe (i.e., DL reception in subframe n−4) in the PCELL. If there is no UL ACK/NACK transmission resource in PCELL in subframe n, then postpone the transmission until it is available with consideration of guideline G2. The second guideline is G2, which is to evenly distribute the HARQ feedback information according to the available UL HARQ ACK/NACK subframes in PCELL.

Although the above guidelines are already applied to PCELL's downlink association set index according to LTE specification (e.g., table 801 in FIG. 8), the proposed Method #6 is different in a way such that it is taking both the PCELL's UL and SCELL's DL resource allocation into account and trying to establish a mapping relationship between them. These guidelines can be used by multiple SCELLs simultaneously as long as they belong to a radio link that has the same PCELL (i.e., carrier aggregation with more than 2 component carriers). FIGS. 12-18 illustrate examples of the mapping between PCELL's UL and SCELL's DL resource allocation described above. However, it is important to note that given examples are not unique. First, the order of the indices within each subframe can be rearranged. Although this might affect the result of HARQ-ACK multiplexing, it will not have impact on the overall system performance. Second, the indices between each subframe can be exchanged. Although this might affect the feedback timing of the corresponding DL resource in SCELL, the fundamental guideline G2 (to be more specific, the feedback information should be evenly distributed across the available UL ACK/NACK subframes in PCELL) is still followed to ensure that the loading of HARQ-ACK is well balanced within a frame.

FIG. 12 illustrates a first example of HARQ feedback timing table in simultaneous DL/UL transceiving with TDD configuration 0 in SCELL.

FIG. 13 illustrates a second example of HARQ feedback timing table in simultaneous DL/UL transceiving with TDD configuration 1 in SCELL.

FIG. 14 illustrates a third example of HARQ feedback timing table in simultaneous DL/UL transceiving with TDD configuration 2 in SCELL.

FIG. 15 illustrates a fourth example of HARQ feedback timing table in simultaneous DL/UL transceiving with TDD configuration 3 in SCELL.

FIG. 16 illustrates a fifth example of HARQ feedback timing table in simultaneous DL/UL transceiving with TDD configuration 4 in SCELL.

FIG. 17 illustrates a sixth example of HARQ feedback timing table in simultaneous DL/UL transceiving with TDD configuration 5 in SCELL.

FIG. 18 illustrates a seventh example of HARQ feedback timing table in simultaneous DL/UL transceiving with TDD configuration 6 in SCELL.

Figure 19:
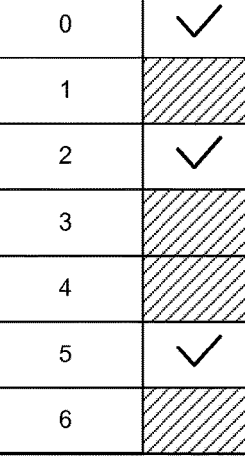
FIG. 19 illustrates a seventh method of HARQ feedback in simultaneous DL/UL transceiving.

The problem of Method #6 is that it requires large amount of timetables in order to take all possible PCELL and SCELL combination into account. However, this problem can be resolved by incorporating Method #1 and Method #5 to method #6. FIG. 19 illustrates a seventh method (Method #7) of HARQ feedback in simultaneous DL/UL transceiving. Table 1901 in FIG. 19 illustrates Method #7 by incorporating Method #1 and Method #5 into Method #6. As depicted by table 1901, each box marked with a check mark indicates valid PCELL-SCELL configuration combination under method #1, and each box having forward-slash-shadow indicates valid PCELL-SCELL configuration combination only if method #5 is applied. The rest of the boxes marked with cross marks are applied with Method #6. In other words, Method #7 is an enhancement of Method #6, and Method #6 is only applied when both Method #1 and Method #5 are not applicable. Method #7 thus reduces the amount of timetables to be stored in UE.

(3.3) Transceiving Configuration (Non-Simultaneous DL/UL)

Figure 20:
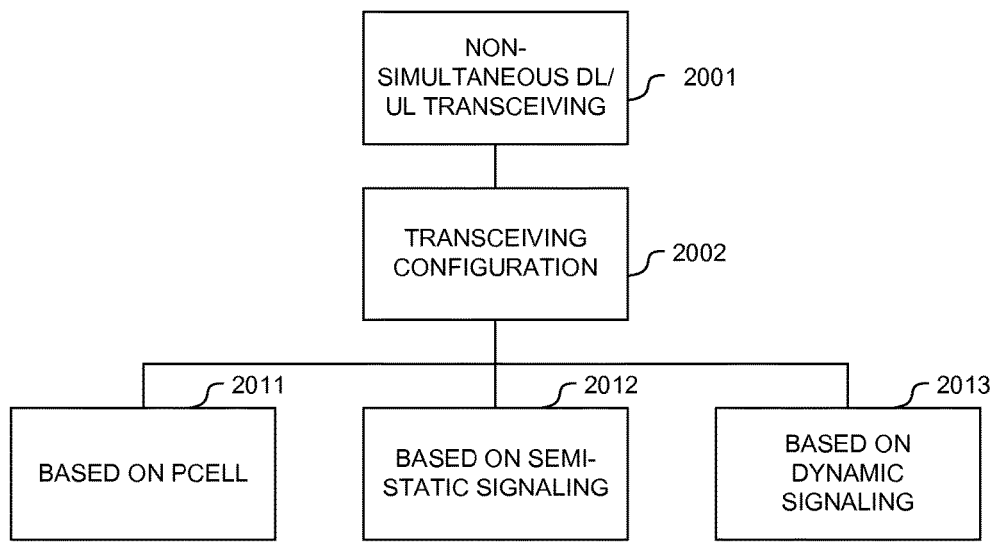
FIG. 20 illustrates transceiving configuration in non-simultaneous DL/UL transceiving.

As explained earlier, in order to support carrier aggregation with different TDD configurations, the DL receptions may overlap with the UL transmissions. While some UEs support simultaneous DL/UL transceiving (full duplex), other UES may only support non-simultaneous DL/UL transceiving (half duplex). For those UEs, non-simultaneous DL/UL transceiving configurations need to be determined. FIG. 20 illustrates different embodiments of different transceiving configurations (e.g., depicted by box 2002) for non-simultaneous DL/UL transceiving (e.g., depicted by box 2001).

Figures 21, 22, 23:
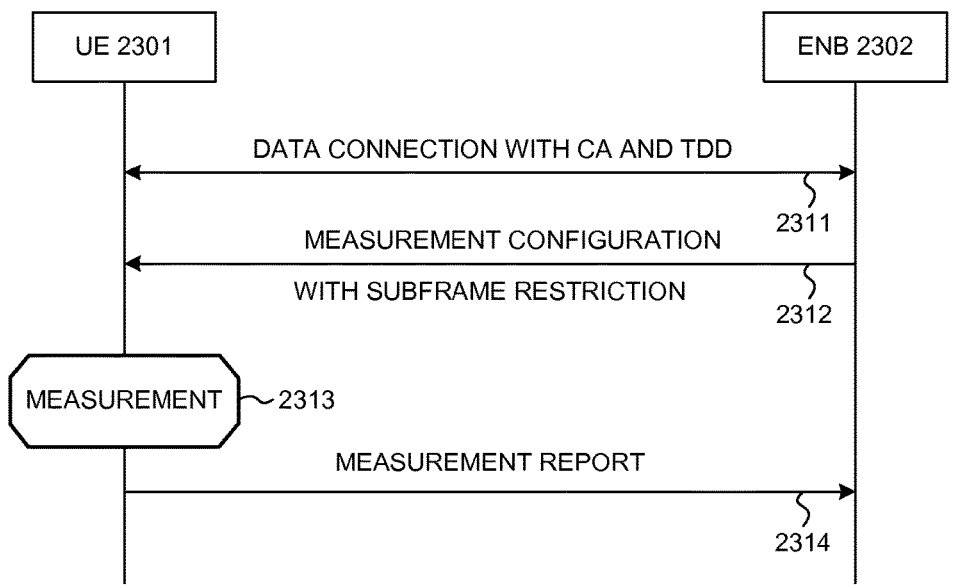
FIG. 21 illustrates an embodiment of transceiving configuration for non-simultaneous DL/UL transceiving.
FIG. 22 illustrates an HARQ feedback problem in non-simultaneous DL/UL transceiving.
FIG. 23 illustrates a method of CQI/RLM/RRM measurement for supporting carrier aggregation with different TDD configurations.

In a first method, as depicted by box 2011, for overlapped DL/UL subframes, whether to perform DL reception or UL transmission for SCELL is based on PCELL, while transceiving on SCELL is blocked. FIG. 21 illustrates an embodiment of such transceiving configuration for non-simultaneous DL/UL transceiving. In the example of table 2101, PCELL has TDD configuration 0, SCELL has TDD configuration 1, and UE follows PCELL's DL/UL configuration. As a result, because subframe 4 and subframe 9 are DL/UL overlapped subframes, the UE blocks downlink transmission in subframe 4 and subframe 9. This method requires no extra signaling, and SCELL transceiving configuration changes accordingly when PCELL TDD configuration changes.

In a second method, as depicted by box 2012, DL reception or UL transmission for SCELL is based on explicit eNB configuration. Under this method, eNB may use RRC signaling to explicitly indicate whether to perform DL reception or UL transmission on overlapped DL/UL subframes. For example, a D/S/U indication map of each frame is transmitted from eNB to indicate the DL/SPP/UL transmissions. UE should follow the indication and block the conflict transmissions. This is a semi-static configuration because eNB may change the configuration through higher-layer RRC signaling.

In a third method, as depicted by box 2013, DL reception or UL transmission for SCELL is based on eNB scheduling. Under this method, eNB may indicate DL reception or UL transmission over overlapped DL/UL subframes by dynamic signaling. For example, eNB can transmit such indication via physical-layer PDCCH/PDSCH and/or PUCCH/PUSCH indications. This is a dynamic configuration because the configuration may be changed via physical layer for each frame.

(3.4) HARQ Feedback Mechanism (Non-Simultaneous DL/UL)

For non-simultaneous DL/UL transceiving, the same HARQ feedback problem may exist as for simultaneous DL/UL transceiving. Since UE should follow either PCELL or eNB determination in the DL/UL overlapped subframes, the HARQ feedback might not follow the original HARQ timetable defined for each TDD configuration. FIG. 22 illustrates an HARQ feedback problem in non-simultaneous DL/UL transceiving. In the example of table 2201, PCELL has TDD configuration 1, SCELL has TDD configuration 0, and UE follows PCELL's DL/UL configuration. As a result, because subframe 4 and subframe 9 are DL/UL overlapped subframes, the UE blocks uplink transmission in subframe 4 and subframe 9. Therefore, the HARQ feedback in SCELL is affected for subframes 4 and 9, because those subframes are scheduled for HARQ feedback according to the original HARQ feedback timetable. To solve such HARQ feedback problem for SCELL, the same methods discussed above with respect to simultaneous DL/UL transceiving may be applied whenever appropriate.

(4) CQI/RLM/RRM Measurement

In LTE/LTE-A systems, radio resource management (RRM) in general relies on measurement values. 3GPP thus has defined measurement-related requirements. The most important measurement aspects include the usefulness, accuracy, and complexity of a particular RRM measurement and its impact on UE power consumption. Channel Quality Indicator (CQI) is one type of measurement performed by UE to indicator the downlink channel quality. Radio Link Monitoring (RLM) is another type of measurement for a UE to monitor DL signal quality by measurement on DL reference signal. RRM is yet another type of measurement to support mobility as well as SCELL addition/modification/release. To support carrier aggregation with different TDD configurations, some DL subframes may be interfered by UL transmission due to simultaneous DL and UL transceiving on different component carriers with are close to each other in frequency band. Furthermore, some DL subframes may be blocked due to non-simultaneous DL and UL transceiving. Therefore, CQI/RLM/RRM measurement on these subframes may lead to inaccurate measurement results.

FIG. 23 illustrates a method of CQI/RLM/RRM measurement for supporting carrier aggregation with different TDD configurations. In the example of FIG. 23, UE 2301 and eNB 2302 establishes data connection under carrier aggregation with different TDD configurations (step 2311). In step 2312, eNB 2302 transmits measurement configuration to UE 2301 (step 2312). In one embodiment, the measurement configuration contains configuration information to restrict CQI/RLM/RRM measurements on the interfered subframes via higher-layer (e.g., RRC) signaling. The RRC signaling consists of a bitmap used to determine which subframes are allowed for measurement. In one example, a new RRC signaling is added. In another example, an existing RRC signaling is reused for Rel-10 eICIC (MeasSubframePattern information element) to restrict the set of subframes for measurement. Upon receiving the measurement configuration, UE 2301 behaves accordingly when it is configured to conduct measurement on the interfered DL subframes (step 2313). In one example, UE 2301 drops UL transmission on the UL subframes which interfere the DL receiving and conduct measurement on the DL subframes. In another example, UE 2301 conducts measurement on the DL subframes no matter whether there is UL transmission at the same time. In step 2314, UE 2301 transmits measurement report to eNB 2302.

In another embodiment, UE is regulated by a pre-defined rule to restrict CQI/RLM/RRM measurements on the interfered subframes. In one example, when there is simultaneous DL and UL transceiving on different component carriers, the UE is not allowed to conduct RLM/RRM and CSI measurement on the interfered DL subframes. In another example, when there is simultaneous DL and UL transceiving on different component carriers in some specific frequency bands, UE is not allowed to conduct RLM/RRM and CSI measurement on the interfered DL subframes.

(5) Capability Signaling

Figures 24, 25:
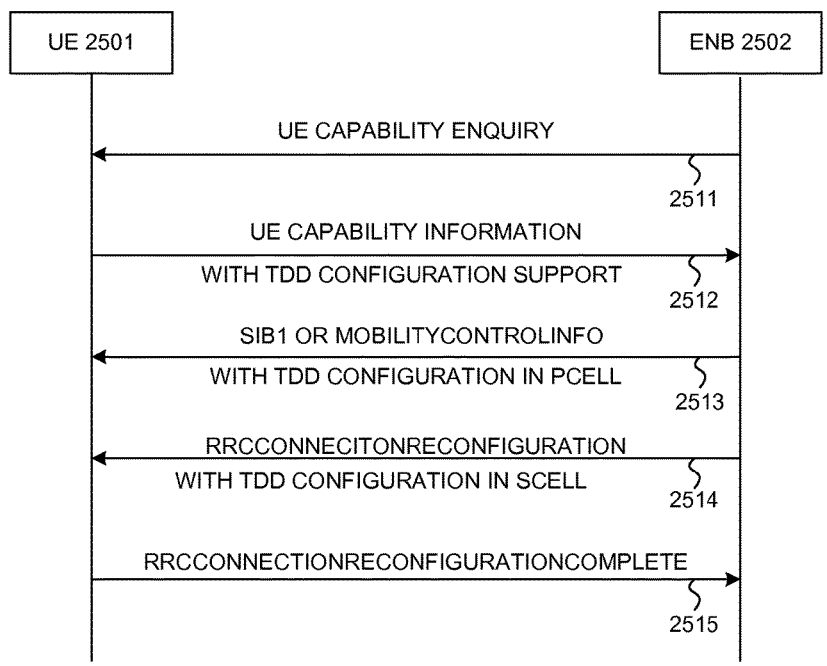
FIG. 24 illustrates a TDD-Config information element that is broadcasted in an SIB1 message.
FIG. 25 illustrates UE capability signaling for supporting carrier aggregation with different TDD configurations.

TDD configuration for each cell is determined by the operator and is broadcasted in system information block 1 (SIB1) from eNB to UE. FIG. 24 illustrates the TDD-Config information element 2401 that is broadcasted in SIB1 message 2402. TDD configuration can be changed by the operator and informed from eNB to UE through SIB1 change or RRC signaling. In one example, MobilityControlInfo Information element contains TDD configuration signaling during handover. In another example, TDD configuration signaling is contained in RRCConnectionReconfiguration message during SCELL addition.

Different UEs have different capability in terms of supporting different TDD configurations. In order for eNB to properly configure carrier aggregation with different TDD configurations, the UE may signal its capability of different TDD configuration support to its serving eNB (e.g., through UE-EUTRA-Capability signaling). The UE may also signal TDD band combination in supported band combination. For example, UE may indicate its support of carrier aggregation on TDD Band39 and Band40 in UE-EUTRA-Capability information element. The eNB then may configure different TDD configurations to the UE if both the UE and the system support (e.g., through RRC connection reconfiguration). In one example, the eNB inform UE the TDD configuration on PCELL via SIB1 or through MobilityControlInfo information element. In another example, the eNB add/modify SCELL with different TDD configuration in RadioResourceConfigCommonSCell through RRCConnectionReconfiguration message.

FIG. 25 illustrates capability signaling for supporting carrier aggregation with different TDD configurations. In the example of FIG. 25, eNB 2502 transmits an UE capability enquiry message to UE 2501 (step 2511). UE 2501 then reports UE capability information to eNB 2502 (step 2512). The reported UE capability information contains different TDD configuration support and supported TDD band combination. In step 2513, eNB 2502 informs UE 2501 TDD configuration in PCELL via SIB1 or via mobility control information. In step 2514, eNB 2502 adds a new SCELL or modifies an existing SCELL configuration with different TDD configuration via RRC connection reconfiguration message. Finally, in step 2512, UE 2501 transmits an RRC connection reconfiguration complete message back to eNB 2502.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a capability enquiry from a base station by a user equipment (UE) in an LTE system with carrier aggregation;
determining UE capability in supporting different time division duplex (TDD) configurations for multiple component carriers by the UE, wherein the UE capability indicates a TDD configuration is supported when a frequency spacing band for the TDD configuration is large enough to avoid in-device inter-band interference between two co-located RF modules with simultaneous transmission and reception;
transmitting UE capability information to the base station, wherein the UE capability information comprises supported TDD configurations for multiple component carriers of the UE; and
receiving different TDD configurations for multiple component carriers from the base station, wherein the different TDD configurations are determined based on the UE capability information.

2. The method of claim 1, wherein the UE capability information further comprises band combination supported by the UE.

3. The method of claim 2, wherein the UE capability information is transmitted via UE-EUTRA-Capability information element.

4. The method of claim 1, wherein the UE receives a first TDD configuration for a primary cell (PCELL) in a broadcasted system information block (SIB) or via a Mobility Control information element during handover operation.

5. The method of claim 4, wherein the UE receives a second TDD configuration for a secondary cell (SCELL) via an RRC connection reconfiguration message when the SCELL is added or modified, wherein the second TDD configuration is different from the first TDD configuration.

6. A user equipment (UE), comprising:
a receiver that receives a capability enquiry from a base station in an LTE system with carrier aggregation, wherein the UE determines UE capability in supporting different time division duplex (TDD) configurations for multiple component carriers based on UE's transceiving capability, and wherein the UE capability indicates a TDD configuration is supported when frequency spacing band for the TDD configuration is large enough to avoid in-device inter-band interference between two co-located RF modules with simultaneous transmission and reception; and
a transmitter that transmits UE capability information to the base station, wherein the UE capability information comprises supported TDD configurations for multiple component carriers of the UE, wherein the UE receives different TDD configurations for multiple component carriers from the base station, wherein the different TDD configurations are determined based on the UE capability information.

7. The UE of claim 6, wherein the UE capability information further comprises band combination supported by the UE.

8. The UE of claim 7, wherein the UE capability information is transmitted via UE-EUTRA-Capability information element.

9. The UE of claim 6, wherein the UE receives a first TDD configuration for a primary cell (PCELL) in a broadcasted system information block (SIB) or via a Mobility Control information element during handover operation.

10. The UE of claim 9, wherein the UE receives a second TDD configuration for a secondary cell (SCELL) via an RRC connection reconfiguration message when the SCELL is added or modified, wherein the second TDD configuration is different from the first TDD configuration.

11. A base station, comprising:
a transmitter that transmits a capability enquiry to a user equipment (UE) in an LTE system with carrier aggregation, wherein the capability enquiry involves UE's capability in supporting carrier aggregation for different time division duplex (TDD) configuration; and
a receiver that receives UE capability information, wherein the UE capability information comprises supported TDD configurations for multiple component carriers of the UE, and wherein the UE capability indicates a TDD configuration is supported when a frequency spacing band for the TDD configuration is large enough to avoid in-device inter-band interference between two co-located RF modules with simultaneous transmission and reception for the UE, and wherein the base station determines different TDD configurations for multiple component carriers, and wherein the different TDD configurations are determined based on the received UE capability information.

12. The base station of claim 11, wherein the UE capability information further comprises band combination supported by the UE.

13. The base station of claim 12, wherein the UE capability information is transmitted via UE-EUTRA-Capability information element.

14. The base station of claim 11, wherein the base station transmits a first TDD configuration for a primary cell (PCELL) of the UE in a broadcasted system information block (SIB) or via a Mobility Control information element during handover operation.

15. The base station of claim 14, wherein the base station transmits a second TDD configuration for a secondary cell (SCELL) of the UE via an RRC connection reconfiguration message when the SCELL is added or modified, wherein the second TDD configuration is different from the first TDD configuration.

* * * * *